US010779166B2

(12) United States Patent
Gloanec et al.

(10) Patent No.: US 10,779,166 B2
(45) Date of Patent: Sep. 15, 2020

(54) TECHNIQUE FOR CONTROLLING ACCESS TO A RADIO ACCESS NETWORK

(71) Applicant: Orange, Paris (FR)

(72) Inventors: Simon Gloanec, Rennes (FR); Herve Marchand, Vern sur Seiche (FR)

(73) Assignee: ORANGE, Paris (FR)

( * ) Notice: Subject to any disclaimer, the term of this patent is extended or adjusted under 35 U.S.C. 154(b) by 74 days.

(21) Appl. No.: 15/779,713

(22) PCT Filed: Nov. 24, 2016

(86) PCT No.: PCT/FR2016/053071
§ 371 (c)(1),
(2) Date: May 29, 2018

(87) PCT Pub. No.: WO2017/089709
PCT Pub. Date: Jun. 1, 2017

(65) Prior Publication Data
US 2019/0075464 A1 Mar. 7, 2019

(30) Foreign Application Priority Data

Nov. 27, 2015 (FR) ...................... 15 61502

(51) Int. Cl.
*H04W 12/08* (2009.01)
*H04W 12/06* (2009.01)
(Continued)

(52) U.S. Cl.
CPC ......... *H04W 12/08* (2013.01); *H04L 63/0236* (2013.01); *H04L 63/0876* (2013.01);
(Continued)

(58) Field of Classification Search
CPC ..... H04W 12/08; H04W 48/04; H04W 12/06; H04W 84/12; H04W 48/12; H04L 63/0876; H04L 63/0236
(Continued)

(56) References Cited

U.S. PATENT DOCUMENTS 6,466,781 B1 * 10/2002 Bromba ............ H04W 12/0608
455/411
8,064,882 B2 * 11/2011 Shatzkamer .......... H04L 63/101
455/411
(Continued)

FOREIGN PATENT DOCUMENTS

| EP | 2426968 A1 | 3/2012 | |
| EP | 2747370 A1 * | 6/2014 | ............. H04L 63/18 |
| EP | 2747370 A1 | 6/2014 | |

OTHER PUBLICATIONS

International Search Report dated Feb. 20, 2017 for corresponding International Application No. PCT/FR2016/053071, filed Nov. 24, 2016.
(Continued)

*Primary Examiner* — David J Pearson
*Assistant Examiner* — Badri Champakesan
(74) *Attorney, Agent, or Firm* — David D. Brush; Westman, Champlin & Koehler, P.A.

(57) ABSTRACT

A technique for controlling access to a radio access network administered by an access device. The device obtains an item of data indicating that the presence of a user has been detected in a detection zone. An access request requesting access to the radio access network is received from an applicant device, the radio access network being prohibited by the access device for a device with physical address corresponding to that of the applicant device. The applicant
(Continued)

device, identified by the address, is then authorized by the access device to access the radio access network.

4 Claims, 3 Drawing Sheets

(51) Int. Cl.
*H04L 29/06* (2006.01)
*H04W 48/04* (2009.01)
*H04W 84/12* (2009.01)
*H04W 48/12* (2009.01)

(52) U.S. Cl.
CPC ........... *H04W 12/06* (2013.01); *H04W 48/04* (2013.01); *H04W 48/12* (2013.01); *H04W 84/12* (2013.01)

(58) Field of Classification Search
USPC .......................................................... 726/4
See application file for complete search history.

(56) References Cited

U.S. PATENT DOCUMENTS

| | | | |
|---|---|---|---|
| 9,119,070 B2* | 8/2015 | Brindza | H04W 12/08 |
| 9,419,980 B2* | 8/2016 | Hewinson | H04L 63/10 |
| 2007/0223424 A1* | 9/2007 | Su | H04L 63/107 370/335 |
| 2008/0020749 A1* | 1/2008 | Delaveau | H04W 24/00 455/423 |
| 2008/0163360 A1* | 7/2008 | Nishida | G06F 21/575 726/17 |
| 2009/0080759 A1* | 3/2009 | Bhaskar | G06T 7/001 382/141 |
| 2011/0107436 A1* | 5/2011 | Cholas | H04L 63/10 726/29 |
| 2012/0033660 A1* | 2/2012 | Mizoguchi | H04W 12/0808 370/338 |
| 2012/0094667 A1* | 4/2012 | Nishida | H04W 60/00 455/435.1 |
| 2013/0337769 A1* | 12/2013 | Bhatia | H04M 15/8016 455/406 |
| 2016/0117495 A1* | 4/2016 | Li | G06F 21/6209 726/1 |
| 2016/0143028 A1* | 5/2016 | Mancuso | H04W 12/08 370/338 |

OTHER PUBLICATIONS

English translation of the International Written Opinion dated Feb. 20, 2017 for corresponding International Application No. PCT/FR2016/053071, filed Nov. 24, 2016.

\* cited by examiner

TECHNIQUE FOR CONTROLLING ACCESS TO A RADIO ACCESS NETWORK

CROSS-REFERENCE TO RELATED APPLICATIONS

This Application is a Section 371 National Stage Application of International Application No. PCT/FR2016/053071, filed Nov. 24, 2016, the content of which is incorporated herein by reference in its entirety, and published as WO WO2017/089709 on Jun. 1, 2017, not in English.

FIELD OF THE DISCLOSURE

The invention relates to the general field of telecommunications.

The invention relates more particularly to a technique for controlling access to a radio access network administered by an access device. This access device allows an access to the radio access network for a user device to be authorized according to physical addresses of authorized devices or this access to be blocked to a user device whose physical address is not a physical address of an authorized device.

BACKGROUND OF THE DISCLOSURE

The access device corresponds for example to a radio access point. This radio access point may be implemented by an access gateway, allowing user devices located in a client site to access a WAN (for "Wide Area Network") wide-area communications network, such as the Internet. These devices correspond for example to a "Set-Top-Box" TV decoder or a mobile terminal. Some of these devices exchange data within the local network by means of the radio access network, via radio communications channels, notably using the wireless transmission technology based on the radio network standard IEEE 802.11 and its evolutions commonly grouped under the term Wi-Fi (for "Wireless Fidelity"). In order to reinforce the security over the radio access network, the access device may also implement a function known under the name of filtering according to physical addresses, such as MAC (for "Medium Access Control") addresses. Such a MAC address allows each device to be identified. The function for filtering according to MAC addresses allows the access to be limited to devices whose MAC address is known by the access device. A device whose address is not authorized thus cannot gain access to the radio access network.

The implementation of this function poses the problem of the management of the MAC addresses authorized to connect, notably in the case of devices connecting temporarily to the radio access network. It is generally complex for a user of the access device to define the authorized MAC addresses. In a first step, they need to connect as an administrator in order to execute an administration software application of the access device. For certain types of access points, the administrator must, in a second step, manually supply the authorized MAC addresses. It is recalled here that the MAC address takes the form of six pairs of characters composed of digits, from 0 to 9, and of letters from a to f, for example 59:1e:4a:c4:21:04. For other types of access points, the administrator may activate the filtering without having defined authorized MAC addresses and may find themself subsequently prevented from gaining access to a configuration menu for the function, owing to their access with a non-authorized wireless device. For these reasons, the function for filtering according to MAC addresses is thus generally not implemented.

SUMMARY

One of the aims of the invention is to overcome shortcomings/drawbacks of the prior art and/or to apply improvements to it.

According to a first aspect, the invention is aimed at a method for controlling access to a radio access network administered by an access device. This method comprises:
  obtaining a data value indicating that the presence of a user has been detected within a detection area;
  receipt, by the access device, of a request for access to the radio access network coming from a requesting device, the access to the radio access network being prohibited by the access device for a device with a physical address corresponding to that of said requesting device;
  authorization, by the access device, of access to the radio access network for the requesting device identified by said address.

A physical address is an address identifying a device. This address is transmitted by the device for an access to the level of a MAC sub-layer for controlling access to the medium. It is known under the name of MAC address.

Prior to the receipt by the access device of the request for access, the requesting device is not authorized to access the access network, even though it potentially shares a secret key with the access device. This is notably the case when the access device implements a filtering function according to physical addresses identifying devices authorized to access.

By virtue of the access control method, the access to the radio access network of a device with a physical address corresponding to that of the requesting device gets authorized, without the need for a connection of an administrator of the access device to an administration software application of the latter. The management of the access authorizations is thus very simple for the administrator of the access device. Because of this simplicity, the security for the access to the resources offered by the access device may be enhanced, by implementing the filtering function according to physical addresses.

The authorized physical addresses are for example managed in the form of a list of authorized devices. The address of the requesting device is added to this list of authorized devices, when the user is located within a detection area. Thus, for a later access, the user will not necessarily have to be located in the detection area in order to be able to gain access to the access network.

An access request is understood to mean a message sent by the requesting device to the access device. This message notably comprises a physical address of the requesting device. According to the implementations of the function for filtering according to addresses within the access device, the access request may correspond to an "Association Request" message, to an "Authenticate Request" message or else any other message sent by the requesting device to the level of the MAC sub-layer for controlling access to the medium.

The data value indicating that the presence of a user has been detected is for example obtained using a proximity detection sensor. This sensor may be integrated into the access device or else co-located with the latter. The detection area thus depends on performance characteristics and on a configuration of a proximity detector.

The access device is for example an access gateway, allowing the devices of a local network to gain access to a WAN communications network. Such an access gateway is installed in a dwelling and the presence of a user in the detection area is thus restricted to persons from this dwelling or authorized to access it.

In one particular embodiment, the radio access network is a Wi-Fi radio network.

The various embodiments or features mentioned hereinafter may be added independently, or in combination with one another, to the steps of the access control method such as previously defined.

In one particular embodiment, the access control method comprises a broadcast by the access device of an identifier of the radio access network triggered by said obtaining of a data value.

By default, the broadcast of the identifier of the access network is not activated. Thus, the radio access network is not identifiable by devices not authorized to access it.

Once a presence has been detected within the detection area, the network identifier is broadcast in order to allow a non-authorized device to detect the radio access network. The requesting device may then become a device authorized for access.

Thus, the security for the access to the resources offered by the access device may be further enhanced, by conditioning the broadcast of the identifier of the network to a detection of the presence of a user in the detection area.

In one particular embodiment, the authorization is given only when the access request is received within an interval of time following said obtaining of a data value.

The modification of the access authorizations is thus only possible for a limited period once the data value has been obtained.

In one particular embodiment, the access control method furthermore comprises the obtaining of another data value indicating that the exit of a user from the detection area has been detected, and in which the access to the radio access network is refused after obtaining said other data value.

Thus, the radio access network does not remain open for authorizing new devices, once the exit from the detection area has been detected.

According to a second aspect, the invention also relates to a device for accessing a radio access network, said device comprising;
- a module for obtaining a data value, configured for obtaining a data value indicating that the presence of a user has been detected within a detection area;
- a receiver module, configured for receiving a request for access to the radio access network coming from a requesting device;
- an address management module, configured for authorizing an access to the radio access network for the requesting device identified by said address, subsequent to the obtaining of said data value, the access to the radio access network being previously prohibited for a device with a physical address corresponding to that of said requesting device.

The advantages presented for the access control method according to the first aspect are directly transposable to the access device.

In one particular embodiment, this access device is an access gateway allowing an access to a wide-area communications network for devices on a local network, notably devices accessing the radio access network.

According to a third aspect, the invention relates to a program for an access device, comprising program code instructions designed to control the execution of the steps of the access control method previously described implemented by the access device, when this program is executed by this device, and a recording medium readable by an access device on which a program for a device is recorded.

The advantages mentioned for the access control method according to the first aspect are directly transposable to the program for an access device and to the recording medium.

BRIEF DESCRIPTION OF THE DRAWINGS

The invention will be better understood with the aid of the following description of particular embodiments of the technique for controlling access, with reference to the appended drawings in which.

DETAILED DESCRIPTION OF ILLUSTRATIVE EMBODIMENTS

Figure 1:
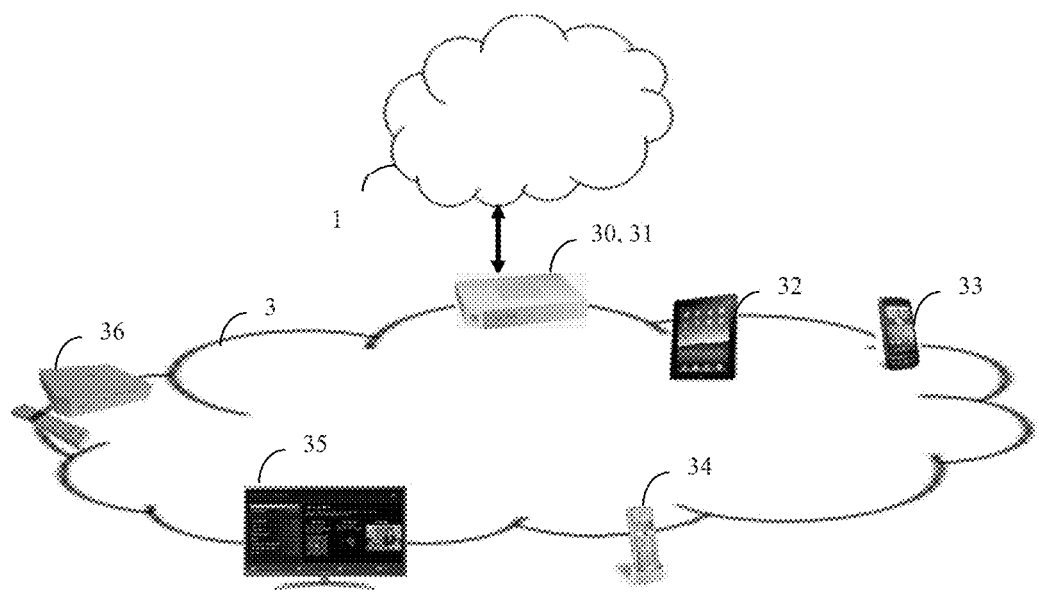
FIG. 1 shows a local network in which the access control technique is implemented according to one particular embodiment.

FIG. 1 shows a private or local communications network 3. The protocol IP (for "Internet Protocol") is used by the devices in the local network for communicating with one another and also for communicating with a wide-area communications network or WAN (for "Wide Area Network"), such as the Internet.

For the environment shown in FIG. 1, a local communications network 3 is understood to mean a network of the LAN ("Local Access Network") type. This network may in particular be a home network or a corporate network. An access gateway 30 is configured for providing devices of the local network 3 with an access to the wide-area communications network (for example the Internet) via an access network 1. The access gateway 30 ensures the routing of data between the access network 1 and the local network 3. This may for example consist of a home gateway or else of a corporate gateway. The access network 1 is for example an access network xDSL (for "Digital Subscriber Line", the x indicating that this may consist of a network ADSL, HSDL, VDSL, etc.). It might also be an FTTH (for "Fiber To The Home") network or a mobile network such as a 3G or 4G network. No limitation is attached to this type of the access network 1.

The devices 32-36 of the local network 3 may be any given devices, for example home devices having a wired or wireless network connection. By way of exemplary illustrations, various devices are shown in FIG. 1. These may for example be a touchscreen tablet 32, a mobile terminal 33, a landline telephone 34, a computer 35, a TV ("Set-Top Box") decoder 36, a games console, domestic appliances, etc.

The local network 3 is, at least in part, a wireless radio access network of the Wi-Fi type, according to the standard IEEE 802.11 "Wireless LAN Medium Access Control (MAC) and Physical Layer (PHY) Specifications" (802.11a/b/g/n/ac). The access gateway 30 is configured for communicating with some of the devices 32, 33 of the local network via the radio access network. In this respect, the access gateway 30 is an access device 31 administering the radio access network. As is shown in FIG. 1, the devices 32, 33 are configured for requesting a connection to the radio access network via this radio access network and for subsequently communicating via the radio access network. The devices of the local network can access the wide-area communications network (Internet) via the access gateway and the access network 1. The exchanges with these devices 32, 33 are carried out within the gateway 30, and therefore the access device 31, by means of a radio access module 312. It is highlighted here that the access gateway 30 can also communicate with certain other devices of the local network via a wired network connection, such as for example with the computer 35.

No limitation is attached to the number of these devices 32, 33, nor to the types of these devices. Furthermore, FIG. 1 illustrates an embodiment in which the access device 31 administering the radio access network is integrated into the access gateway 30. No limitation is attached to this representation. The following part of the description considers the point of view of the access device 31, in which the access control technique is implemented.

The access device 31 also implements a filtering function according to physical addresses, such as MAC (for "Medium Access Control") addresses, for an access to the radio access network. Such a MAC address is associated with each of the devices and allows the device to be identified. The function for filtering according to MAC addresses allows the access to be limited to devices whose MAC address is authorized by the access device 31. A device whose address is not authorized can consequently not access the radio access network. An authorized device is thus a device whose address is known to the access device. This authorized device knows the security key, where required.

The access device 31 furthermore comprises a proximity detector module 313, configured for obtaining a data value indicating that the presence of a user has been detected within a detection area. The proximity detector module 313 is, in one embodiment, a proximity detection sensor. This proximity detection sensor is for example an optical proximity detector, whose output depends on the comparison of a level of reflected light with respect to a threshold. By way of exemplary illustration, the proximity detector module 313 is a component Si1102 marketed by the company Silicon Labs.

In another particular embodiment, the proximity detection sensor is co-located with the access device 31 and supplies the data value indicating that the presence of a user has been detected within a detection area to the proximity detector module 313.

Furthermore, the user may be informed that their presence has been detected by an indication, such as the illumination of a light-emitting diode (or LED) on the access device or else a display on a screen of the access device.

Figure 2A:
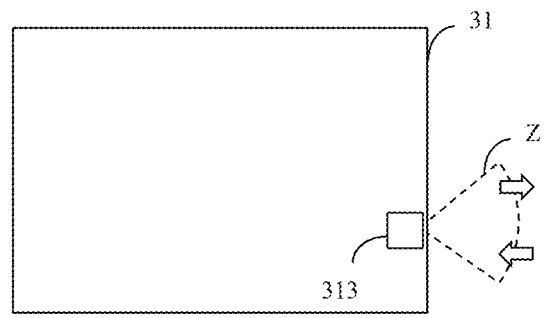
FIGS. 2a-2c illustrate a detection area in which the presence of a user is detectable.
Figure 2B:
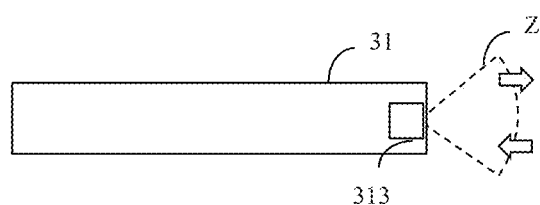
Figure 2C:
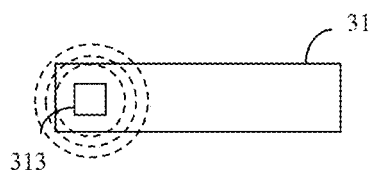

FIGS. 2a-2c illustrate, in one particular embodiment, a detection area Z in which the presence of a user is detectable. FIG. 2a shows the access device 31, seen from the top and FIG. 2b shows this same device, seen from the side. The detection area Z is represented in the form of a circular sector centered on the module 313. The entry or the exit of a user into or out of the detection area, symbolized with arrows in FIGS. 2a and 2b, are for example detected at a distance of around fifteen centimeters (threshold of detection). It will thus be understood that the detection module 313 is configured for detecting a proximity of the user with respect to the access device 31. The user is then at a distance allowing them to interact with the access device 31, for example by means of a man-machine interface. The detection threshold must remain relatively low, for example less than a meter. Indeed, only a low detection threshold allows sufficient security guarantees to be provided for configuring a security mechanism. A threshold of the order of fifteen centimeters only allows users able to handle the access device 31 to be detected. FIG. 2c, on the other hand, shows the access device 31 seen from the front. The detection module 313 is for example situated just behind a front panel of the access device 31. The detection area Z corresponds to a disk centered on the detection module 313.

In one particular embodiment, the data value indicating that the presence of a user is detected corresponds to an event "entry into the detection area". In one particular embodiment, another data value indicating that the exit of a user from the detection area has been detected is obtained. This other data value corresponds to an event "exit from the detection area".

The access control method thus takes into account the data value indicating that the presence of a user has been detected within the detection area Z in order to authorize an access for a user device 32, 33 to the radio access network, allowing it to establish a connection with the access device 31. The physical address of this user device is then added to the list of the devices authorized to access the radio access network. A future access request from this user device 32, 33 will not be blocked by the access device 31.

The operations to be carried out in one particular embodiment of the prior art for configuring a list of devices authorized to access the radio access network are briefly recalled here. The computer 35 is connected to the access device 31 by means of a wired link, for example Ethernet. The administrator of the local network 3 connects to the administration software of the access device 31 using the computer 35. The administrator activates the function for filtering according to MAC addresses and configures this list by inputting the MAC address of each of the devices authorized to access. By comparison, by virtue of the access control method, the address of a user device, requesting an access, is added to the list of the devices authorized to access, when a user, and therefore their device, are located within the detection area Z, without requiring any connection of an administrator. For the administrator of the access device 31, this simplifies the implementation of the filtering according to MAC addresses. The latter is then more often activated by the administrator and this reinforces the security of the access to the radio access network.

In one particular embodiment, the security mechanism WPA (for "Wi-Fi Protected Access") is used. The two user devices 32, 33 share a secret key K, also known as security key, with the access device 31. When the access of the user device 32, 33 to the access network is authorized, authentication and association steps are implemented by the user device 32, 33 and the access device 31. The data sent between the user device 32, 33 and the access device 31 is subsequently encrypted by means of the security key. It is also possible to implement other security mechanisms such as WEP (for "Wired Equivalent Privacy"), WPA2.

The access control technique implemented by the access device 31 will now be described more precisely in particular embodiments in the environment of FIG. 1 in relation with FIGS. 3a and 3b. By way of illustration, in the initial state, none of the devices 32, 33 is authorized to access the radio access network. The case of the particular embodiment where the user device 32 shares the security key with the access device 31 is considered.

Figure 3A:
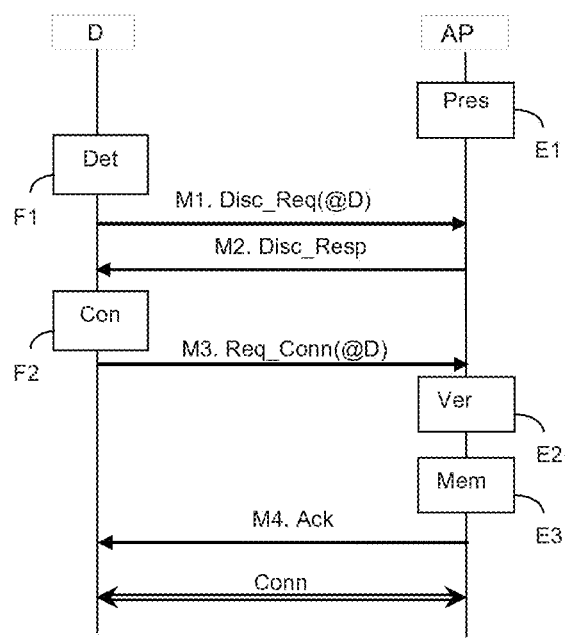
FIGS. 3a-3b illustrate steps of an access control method according to particular embodiments.

FIG. 3a describes more precisely the exchanges between the access device 31 and the user device 32 during an access request made by this user device, in a first embodiment. It is recalled here that the access device 31 and the user device 32 communicate via the radio access network, more precisely over a communication channel of the radio access network.

A beacon signal carrying an access network identifier is broadcast by the access device 31. The access network identifier is known under the name of SSID (for "Service Set Identifier").

In a step F1, the user device 32 detects the radio access network. More precisely, the user device 32 receives the broadcast beacon signal and reads the access network identifier. Still in this step F1, the user device 32, also referred to as requesting device, sends a probing message M1 "Probe Request" for the attention of the access device 31. A response message M2 is transmitted to the user device 32. The message M2 corresponds to a "Probe Response" message.

In a step F2, the user device 32 sends an access request M3 to the radio access network. This access request M3 corresponds to a message for requesting authentication "Authenticate Request". This message notably comprises a device identifier in the form of its physical MAC address. It is recalled here that the access to the radio access network is initially prohibited (or blocked) by the access device 31 for a device with a physical address corresponding to that of this requesting device 32.

This access request M3 is received by the access device 31 in a step E2. Still in this step E2, the access device 31 verifies whether the user device 32 is authorized for access. This verification is notably carried out based on a list of authorized MAC addresses. If the user device 32 is authorized for access, the establishment of the connection goes ahead. The exchanges are not detailed further here. If the user device 32 is not authorized for access, the access device 31 verifies whether a data value indicating that the presence of a user has been detected within the detection area Z has been obtained during a step E1. It is pointed out here that the order of execution of these two steps E1 and E2 is immaterial. Indeed, the user device may for example initiate the sending of the access request leading to the execution of the step E2 outside of the detection area Z and be subsequently situated within the detection area (step E1), in order to allow the addition of its address to the list of the authorized devices. Again by way of example, the user device may initiate the sending of the access request leading to the execution of the step E2 within the detection area Z, the data value indicating that the presence of a user has been detected (step E1) having then been obtained prior to the step E2. It goes without saying that there does however exist a temporal link between the execution of these two steps. This is described in the following part.

If a data value indicating that the presence of a user has been detected within the detection area Z has been obtained during a step E1, the access of the user device 32, identified by its MAC address, to the radio access network is authorized by the access device 31. The MAC address of the requesting device is added to the list of authorized MAC addresses in a step E3. This MAC address is obtained from the access request M3 received at the step E2 via the radio access network. The access to the radio access network is then authorized by the access device 31 for a device with a physical address corresponding to that of this requesting device 32. An acknowledgement message M4 is transmitted to the user device 32. The message M4 corresponds to an "Authenticate Response" message. The connection is subsequently established between the user device 32 and the access device 31 by implementation of an association step, not detailed here. When these steps have been carried out, the user device 32 is associated with the access device 31 on the radio access network and may thus transmit and receive data coming from other devices on the radio network. A connection is thus established between the user device 32 and the access device 31 over the radio access network. The management of the list of MAC addresses is thus simplified for the administrator of the access device 31.

The access control method is more precisely defined according to the various embodiments of the filtering according to MAC addresses. In one particular embodiment, this function needs to be disabled in order to be able to process the access request M3. This disabling is effected following the execution of the step E1. A timer T is then triggered in order to supervise the receiving of the access request. Once the timer has expired, the function for filtering according to MAC addresses is re-activated. Indeed, the radio access network must not remain "open" (for authorizing new devices) for too long an interval of time. By way of exemplary illustration, the timer T is fixed at five minutes. In one particular complementary embodiment, the function for filtering according to MAC addresses is re-activated once an access request has been processed by the access device. Only one user device is thus authorized at a time.

In another embodiment, the function for filtering according to MAC addresses remains activated. The user device 32 is then waiting for authorization and gets authorized when the data value has been obtained at the step E1.

In another embodiment, a data value indicating that the exit of a user from the detection area has been detected is obtained. In this case, the access to the radio access network is refused for a request received after this data value has been obtained. Thus, the radio access network does not remain open for authorizing new devices once the exit from the detection area has been detected.

These embodiments have been described for a configuration of the filtering according to MAC addresses implemented when an access request corresponding to a message "Authenticate Request" has been received. In another embodiment, the configuration of the filtering according to MAC addresses is implemented after authentication of the user device 32 with the access device 31. The access request M3 then corresponds to a message "Association Request" sent by the user device 32 and the acknowledgement message M4 corresponds to a message "Association Response". In yet another embodiment, the radio access network is not protected by a security key. The access request M3 then corresponds to a message "Association Request" sent by the user device 32 and the acknowledgement message M4 corresponds to a message "Association Response".

The access control method is thus readily transposable by those skilled in the art according to the embodiment of the filtering according to MAC addresses in the access device 31.

Figure 3B:
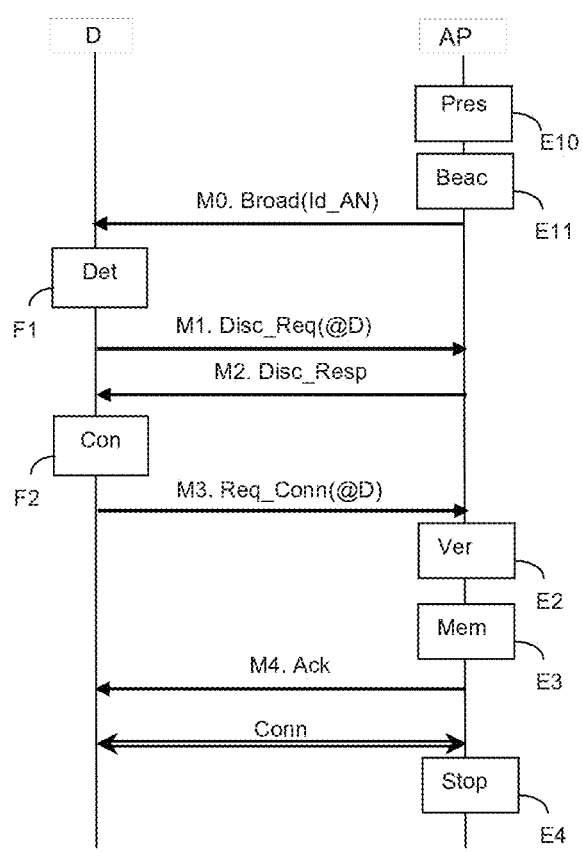

FIG. 3b describes more precisely the exchanges between the access device 31 and the user device 32 when an access request is sent by this user device, in a second embodiment.

In the initial state, the access device 31 broadcasts a beacon signal not comprising any access network identifier. The radio access network is thus masked for the user devices not having the knowledge of the network identifier. This mechanism allows the security of the radio access network to be reinforced.

In a step E10, similar to the step E1 described in relation with the first embodiment, the access device 31 obtains a data value indicating that the presence of a user has been detected within the detection area Z.

In a step E11, triggered by the obtaining of a data value at the step E10, the access device 31 modifies the broadcast beacon signal M0 in order for the latter to carry an access network identifier. Thus, a user device can detect the radio access network and try to connect to it.

At the step F1, the user device 32 detects the radio access network. More precisely, the user device 32 receives the broadcast beacon signal and reads the access network identifier. Still in this step F1, the user device 32, also referred to as requesting device, sends a probing message M1 "Probe Request" for the attention of the access device 31. A response message M2 is transmitted to the user device 32. The message M2 corresponds to a message "Probe Response".

In a step F2, the user device 32 sends an access request M3 to the radio access network, as previously described in relation with the first embodiment. It is recalled here that the access to the radio access network is initially prohibited by the access device 31 for a device with a physical address corresponding to that of the requesting device 32.

This access request M3 is received by the access device 31 at the step E2. Still in this step E2, the access device 31 verifies whether the user device 32 is authorized for access. This verification is notably carried out using a list of authorized MAC addresses. If the user device 32 is authorized for access, the establishment of the connection goes ahead. If the user device 32 is not authorized for access, the access device 31 verifies whether a data value, indicating that the presence of a user has been detected within the detection area Z, has been obtained during the step E10.

If a data value, indicating that the presence of a user has been detected within the detection area Z, has been obtained during the step E10, the access of the user device 32, identified by its MAC address, to the radio access network is authorized by the access device 31. The MAC address of the requesting device is added to the list of authorized MAC addresses in a step E3. The access to the radio access network is then authorized by the access device 31 for a device with a physical address corresponding to that of said requesting device 32. An acknowledgement message M4 ("Authenticate Response") is transmitted to the user device 32. The connection is subsequently established between the user device 32 and the access device 31 by implementing an association step, not detailed here. At the end of this step, the user device 32 is associated with the access device 31 on the radio access network and may thus transmit and receive data coming from other devices on the radio network. A connection is thus established between the user device 32 and the access device 31 over the radio access network. The management of the list of MAC addresses is thus simplified for the administrator of the access device 31. In a step E4, the access device 31 stops broadcasting the access network identifier, notably in the beacon signal. This allows the additional security provided by the absence of the broadcast of the network identifier to be re-established.

The access control method is more precisely defined according to the various embodiments of the filtering according to MAC addresses. As previously described in relation with the first embodiment, in one particular embodiment, this function needs to be disabled in order to be able to receive the access request M3. This disabling is effected subsequent to the execution of the step E11. A timer T is then triggered in order to supervise the receiving of the access request. Once the timer has expired, the function for filtering according to MAC addresses is re-activated. Indeed, the radio access network must not remain open for authorizing new devices for too long an interval of time. By way of exemplary illustration, the timer T is fixed at five minutes. In one particular complementary embodiment, the function for filtering according to MAC addresses is re-activated once an access request has been processed by the access device. Only one user device is thus authorized at a time.

In another embodiment, the function for filtering according to MAC addresses remains active. The user device 32 is then waiting for authorization and gets authorized when the data value has been obtained at the step E11.

In another embodiment, a data value indicating the exit of a user from the detection area has been detected is obtained. In this case, the broadcast of the radio access network identifier is stopped; the network again becomes masked. It is also possible to refuse the access to the radio access network for a request received after this data value has been obtained. Thus, the radio access network does not remain visible and open for authorizing new devices once the exit from the detection area has been detected.

These embodiments have been described for a configuration of the filtering according to MAC addresses implemented when an access request corresponding to a message "Authenticate Request" has been received. In another embodiment, the configuration of the filtering according to MAC addresses is implemented after authentication of the user device 32 with the access device 31. The access request M3 then corresponds to a message "Association Request" sent by the user device 32 and the acknowledgement message M4 corresponds to a message "Association Response". In yet another embodiment, the radio access network is not protected by a security key. The access request M3 then corresponds to a message "Association Request" sent by the user device 32 and the acknowledgement message M4 corresponds to a message "Association Response".

The access control method is thus readily transposable by those skilled in the art according to the implementation of the filtering according to MAC addresses within the access device 31.

These particular embodiments are also applicable to an implementation where the access device is furthermore configured in the initial state to not respond to probing messages, or "Probe Request" messages, sent by user devices and requesting access devices to declare themselves. In this case, in the step E11, the access device is configured to respond to such probing messages by broadcasting its access network identifier.

A device 31 for accessing a radio access network will now be described in one particular embodiment with reference to FIG. 4. Such a device notably comprises:
- a memory area 311, configured for storing a program that comprises code instructions for implementing the steps of the access control method, such as described in relation with FIGS. 3a and 3b;
- a storage memory 316, configured for storing data used during the implementation of the access control method, such as previously described, notably data on authorized MAC addresses;
- a processor 310 for executing code instructions of software modules;
- a radio access module 312, configured for communicating over the radio access network with user devices, over a communication channel of the radio access network, notably for receiving a request for access to the radio access network coming from a requesting device 32, 33;
- a proximity detector module 313, configured for obtaining a data value indicating that the presence of a user has been detected within a detection area;

an address management module 314, configured for authorizing an access to the radio access network for the requesting device identified by said address, activated when said data value has been obtained, the access to the radio access network being previously prohibited for a device with a physical address corresponding to that of said requesting device;

a module 315 for filtering according to MAC addresses, configured for blocking an access of a device with a physical address whose address is not authorized.

Figure 4:
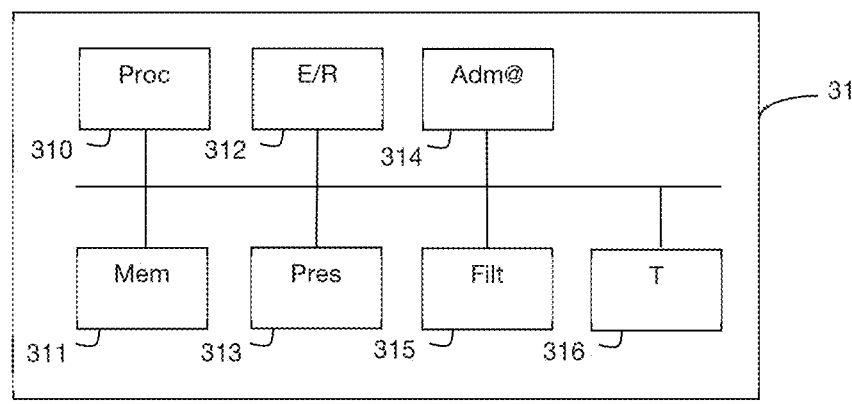
FIG. 4 shows an access device according to one particular embodiment.

It is pointed out here that the access device 31 also comprises others processing modules, not shown in FIG. 4, configured for implementing the various functions of such a device.

The radio access module 312 allows an access to a radio access wireless network of the Wi-Fi type.

The proximity detector module 313 is for example a proximity detection sensor.

In one particular embodiment, the module 313 is configured for obtaining another data value indicating that the exit of a user from the detection area has been detected and for sending a command to disable the address management module 314. The access to the radio access network is then refused after obtaining this other data value.

In one particular embodiment, the radio access module 312 is notably configured for broadcasting or not broadcasting an identifier of the radio access network. The module 313 for obtaining a data value is notably configured for triggering the broadcast when the data value has been obtained and for stopping the broadcast of the identifier of the radio access network depending on the conditions such as the expiration of an interval of time after having received the data value, the obtaining of another data value indicating that the exit of a user from the detection area has been detected, the receipt of an access request.

In one particular embodiment, the access device 31 furthermore comprises a security module, configured for verifying that a device is sharing a security key with it, prior to authorizing a connection to the radio access network, and for subsequently protecting the exchanges.

The access control technique is implemented by means of software and/or hardware components. In this respect, the term "module" may just as easily correspond in this document to either a software component or a hardware component or to an assembly of hardware and/or software components, capable of implementing a function or a set of functions, according to what is previously described for the module in question.

A software component corresponds to one or more computer programs, one or more sub-programs of a program, or more generally, to any element of a program or of a software application. Such a software component is stored in memory then loaded and executed by a data processor of a physical entity and is able to access the hardware resources of this physical entity (memories, recording media, communications bus, electronic input/output cards, user interfaces, etc).

In the same way, a hardware component corresponds to any element of a hardware assembly. This may be a programmable or non-programmable hardware component, with or without an integrated processor for the execution of software. This could for example be an integrated circuit, a smart card, an electronic board for the execution of a firmware, etc.

In one particular embodiment, the modules 314, 315 are configured for implementing the access control method previously described. These are preferably software modules comprising software instructions for the execution of the steps from those of the access control method previously described, implemented by an access device. The invention therefore also relates to:

a program for an access device, comprising program code instructions designed to control the execution of the steps of the access control method previously described, when said program is executed by this access device;

a recording medium readable by an access device on which the program for a device is recorded.

The software modules may be stored in or transmitted by a data medium. The latter may be a hardware storage medium, for example a CD-ROM, a magnetic means of recording, for example a magnetic diskette or a hard disk. On the other hand, the data medium may be a transmission medium such as an electrical, optical or radio signal, which may be channeled via an electrical or optical cable, by radio or by other means. The program code instructions may in particular be downloaded over a network of the Internet type.

Alternatively, the data medium may be an integrated circuit within which the program is incorporated, the circuit being designed to execute or to be used in the execution of the access control method previously described.

Although the present disclosure has been described with reference to one or more examples, workers skilled in the art will recognize that changes may be made in form and detail without departing from the scope of the disclosure and/or the appended claims.

The invention claimed is:

1. A method for controlling access to a radio access network administered by an access device, said method comprising:

obtaining, by the access device and from a proximity detection sensor, a data value indicating that presence of a user has been detected within a detection area;

broadcasting by the access device an identifier of the radio access network triggered by the obtaining of the data value;

receiving, by the access device, a request for access to the radio access network coming from a requesting device, said access request comprising a physical address identifying the requesting device, the access to the radio access network being previously prohibited by the access device for the requesting device with the physical address;

authorizing, by the access device, access to the radio access network for the requesting device identified by said physical address by taking account of the data value; and obtaining second data value indicating that exit of said user from the detection area has been detected, and in which the access to the radio access network is refused after obtaining said second data value.

2. The access control method as claimed in claim 1, in which the authorization is given only when the access request is received within a predefined interval of time following said obtaining of said data value.

3. An access device for accessing a radio access network, said access device comprising:

a processor; and a non-transitory computer-readable medium comprising instructions stored thereon, which when executed by the processor configure the access device to perform acts comprising:

obtaining from a proximity detection sensor a data value indicating that presence of a user has been detected within a detection area;

broadcasting by the access device an identifier of the radio access network triggered by the obtaining of the data value;

receiving a request for access to the radio access network coming from a requesting device, said access request comprising a physical address identifying the requesting device;

authorizing an access to the radio access network for the requesting device identified by said physical address, subsequent to and by taking account of the obtaining of said data value, the access to the radio access network being previously prohibited for the requesting device identified by the physical address; and obtaining second data value indicating that exit of said user from the detection area has been detected, and in which the access to the radio access network is refused after obtaining said second data value.

4. A non-transitory computer-readable recording medium comprising program code instructions stored thereon, which when executed by a processor of an access device configure the access device to perform acts comprising:

obtaining from a proximity detection sensor a data value indicating that presence of a user has been detected within a detection area;

broadcasting by the access device an identifier of a radio access network triggered by the obtaining of the data value;

receiving a request for access to the radio access network coming from a requesting device, said access request comprising a physical address identifying the requesting device;

authorizing an access to the radio access network for the requesting device identified by said physical address, subsequent to and by taking account of the obtaining of said data value, the access to the radio access network being previously prohibited for the requesting device identified by the physical address; and obtaining second data value indicating that exit of said user from the detection area has been detected, and in which the access to the radio access network is refused after obtaining said second data value.

\* \* \* \* \*